(12) United States Patent
Gonzalez (10) Patent No.: US 8,955,427 B2
(45) Date of Patent: Feb. 17, 2015

(54) TOP CHUCK PLATE AND PRUNE PITTING APPARATUS INCLUDING SAME

(75) Inventor: Claudio Cortez Gonzalez, Penalolen (CL)

(73) Assignee: Ashlock Company, a division of Vistan Corporation, San Leandro, CA (US)

( * ) Notice: Subject to any disclaimer, the term of this patent is extended or adjusted under 35 U.S.C. 154(b) by 314 days.

(21) Appl. No.: 13/471,605

(22) Filed: May 15, 2012

(65) Prior Publication Data
US 2013/0305934 A1 Nov. 21, 2013

(51) Int. Cl.
*A23N 3/00* (2006.01)
(52) U.S. Cl.
USPC .................... 99/494; 99/547; 99/559; 99/561; 99/562; 99/565
(58) Field of Classification Search
CPC ............. A23N 3/00; A23N 3/04; A23N 4/02; A23N 4/04; A23N 4/06; A23N 4/08; A47J 25/00; A47J 23/00; A47J 29/00; A47J 29/02; A47J 29/04; A47J 29/06
USPC ............................ 99/489, 490, 494, 547–566
See application file for complete search history.

(56) References Cited

U.S. PATENT DOCUMENTS 5,870,949 A * 2/1999 Cimperman et al. ........... 99/559

* cited by examiner

*Primary Examiner* — Brian Jennison
(74) *Attorney, Agent, or Firm* — Girard & Equitz LLP (57) ABSTRACT

An apparatus for removing pits from prunes or other soft fruit, including holders defining pockets for holding soft fruit, an excess fruit removal assembly (e.g., comprising one or more paddle wheels), a pitting knife assembly, and a holder drive assembly for translating the holders along a closed loop. Each pocket defined by each holder is movable between open and closed configurations as the holder is translated around the loop. Each holder includes a top chuck plate shaped to guide an article of fruit into each pocket with reduced risk that excess fruit (fruit not properly seated in a pocket) will remain lodged on the chuck plate after the holder has translated past the excess fruit removal assembly. Other aspects are a chuck plate configured for use as a top chuck plate of a fruit holder of a pitting apparatus, and a fruit holder including such a chuck plate.

8 Claims, 10 Drawing Sheets

TOP CHUCK PLATE AND PRUNE PITTING APPARATUS INCLUDING SAME

FIELD OF THE INVENTION

The invention is an apparatus for removing pits from prunes or other soft fruit such as dates, and a top chuck plate for use in such an apparatus. The inventive fruit pitting apparatus is configured to translate prunes (or other soft fruit) seated in holders past an excess fruit removal assembly to a pitting knife assembly, where each of the holders defines at least one pocket and includes a top chuck plate shaped to guide an article of fruit into the pocket with reduced risk that excess fruit (fruit not properly seated in a pocket) will remain lodged on the chuck plate after the holder has translated past the excess fruit removal assembly.

BACKGROUND OF THE INVENTION

Several types of conventional prune pitting apparatus are described in U.S. Pat. No. 3,556,281, issued Jan. 19, 1971, and in U.S. Pat. No. 5,870,949, issued Feb. 16, 1999.

In operation of a conventional prune pitting apparatus, prunes (or other articles to be pitted) fall from a hopper onto holders. A conveyor translates the holders around a closed processing path. Each holder defines at least one pocket, and typically it defines a row of four pockets (or another small number of pockets). Each pocket is configured to be closed (to grip a prune within the pocket) and opened (so that no gripping force is exerted on a prune with the pocket) at different points around the path. Each pocket is closed and opened by force exerted by cams on the holders as they translate past the cams.

Each holder includes a top (or "upper") chuck plate shaped to guide a prune into each pocket defined by the holder. Typically, each holder also includes a pitting cup (sometimes referred to as a pitting "rubber") at the location of each pocket, and the top chuck plate is shaped to guide a prune onto the pitting cup, as the holder translates past a prune loading station. During operation, the conveyor translates each holder past the prune loading station, and the conveyor then translates each holder past an excess fruit removal assembly to remove excess prunes (prunes not properly seated in pockets) from the holder while leaving one prune seated in each pocket. The excess fruit removal assembly is typically implemented as a paddle wheel (or set of paddle wheels), which sweeps across the cup(s) of each holder.

After translating the holders past the excess fruit removal assembly, the conveyer translates the holders to a pitting knife assembly (which pits prunes as they are gripped within the pockets), and the pitted prunes are then ejected from the pockets.

However, conventional holders have been configured in such a way that there is a significant risk that excess prunes (prunes not properly seated in pockets) can remain lodged (e.g., can be stuck) on a holder even after the holder is translated past an excess fruit removal assembly. Although it is undesirable for an excess prune (a prune not properly seated in a pocket) to be carried by the holder to the pitting knife assembly, conventional prune pitting apparatuses have been subject to significant problems (during operation) due to the frequent occurrence of incidents in which excess prunes are carried to the pitting knife assembly.

SUMMARY OF THE INVENTION

In a class of embodiments, the invention is an apparatus for removing pits from prunes (or other soft fruit such as dates), including holders defining pockets for holding soft fruit, an excess fruit removal assembly (e.g., comprising one or more paddle wheels), a pitting knife assembly (including a set of one or more pitting knives), and a holder drive assembly for translating the holders (continuously or intermittently) along a closed loop past the excess fruit removal assembly and the pitting knife assembly. Each pocket defined by each holder is configured to be movable between an open configuration and a closed configuration as the holder is translated around the closed loop. The holders include at least one holder including a top chuck plate mounted to a pocket subassembly, where the pocket subassembly defines at least one pocket movable between an open configuration and a closed configuration, and the top chuck plate is shaped to guide an article of fruit into each said pocket with reduced risk that excess fruit (fruit not properly seated in one said pocket) will remain lodged on the top chuck plate after the holder has translated past the excess fruit removal assembly. The top chuck plate is shaped so that each straight leading edge of its top surface has a width which is sufficiently small (relative to the plate's overall width) such that the risk that an article of fruit can remain lodged on the top chuck plate (even after each paddle of a paddle wheel has swept over the chuck plate and a fruit holder including the chuck plate has translated past the paddle wheel) is acceptably low.

In typical embodiments, each of the holders (i.e., the pocket subassembly thereof) defines four pockets, the excess fruit removal assembly comprises at least one paddle wheel, and each paddle wheel defines four paddles. Each paddle wheel is configured and positioned such that in operation of the pitting apparatus (with the holders translating successively into engagement with the paddle wheel), each of the paddles sweeps over one of the pockets of each holder of a sequence of the holders. For example, the excess fruit removal assembly may include two paddle wheels, configured and positioned such that in operation of the pitting apparatus (with a sequence of holders translating successively into engagement with the excess fruit removal assembly), each of the paddles of one of the paddle wheels sweeps over one of the pockets of each holder of the sequence, and each of the paddles of the other one of the paddle wheels sweeps over one of the pockets of each holder of the sequence.

Other aspects of the invention are a chuck plate configured for use as a top chuck plate of a fruit holder of a fruit pitting apparatus (e.g., a fruit holder of any embodiment of the inventive fruit pitting apparatus), and a fruit holder including such a chuck plate.

In preferred embodiments, the inventive chuck plate lacks large surfaces and edges on which excess fruit (fruit not properly seated in a pocket) can become lodged, even after paddles of a paddle wheel have swept over the chuck plate (e.g., when the chuck plate is mounted to a holder translating past the paddle wheel). For example, one such embodiment has a top surface, a bottom surface, a front face, and a rear face, and defines a set of openings (e.g., four circular openings or another small number of circular openings) extending through the chuck plate from the top surface to the bottom surface, and the top surface has sloping surfaces around each opening in the set for guiding an article of fruit through the opening (so that the fruit can fall through the opening into a pocket defined by a fruit holder, e.g., onto a cup of the holder, when the plate is included as the top chuck plate of the holder). Preferably, the chuck plate has (for each said opening) a curved top front edge between the sloping surfaces (around the opening) and the front face, and a curved top rear edge between the sloping surfaces (around the opening) and the rear face, and the curved top front edge and the curved top rear edge are shaped to receive a paddle (of a paddle wheel) as the paddle sweeps over the chuck plate. The top surface of the chuck plate has a small non-sloping surface between the sloping surfaces of each two adjacent openings in the set, each two adjacent curved top rear edges, and each two adjacent curved top rear edges. The front edge of each non-sloping surface is a straight leading edge having a width which is sufficiently small (relative to the plate's overall width) such that it is very unlikely that an article of fruit (e.g., a prune) can become lodged on one said non-sloping surface or on an edge of the non-sloping surface, and thus it is very unlikely that such an improperly seated fruit article can remain on the chuck plate even after each paddle has swept over the chuck plate and a fruit holder (including the chuck plate) has translated past the paddle wheel. Each straight leading edge of the chuck plate's top surface (i.e., the front edge of each non-sloping surface) has a width which is sufficiently small (relative to the plate's overall width) such that the risk that an article of fruit can remain lodged on the top chuck plate (even after each paddle of a paddle wheel has swept over the chuck plate and a fruit holder including the chuck plate has translated past the paddle wheel) is acceptably low.

In a class of embodiments, the width ("W2") of each straight leading edge of the inventive chuck plate's top surface (e.g., the width of each front edge of each non-sloping surface of the chuck plate's top surface) is less than one twentieth (and preferably, less than one thirtieth) of the plate's overall width (e.g., W2=0.4 cm or W2=0.5 cm when the plate's overall width is 22 cm). In contrast, the width ("W") of the front edge of each non-sloping surface of a typical conventional chuck plate's top surface is greater than one tenth of the plate's overall width (e.g., W may be equal to 2.5 cm when the overall width is 22 cm).

DETAILED DESCRIPTION OF THE PREFERRED EMBODIMENT

Preferred embodiments of the inventive pitting apparatus will be described with reference to FIGS. 1-10. A preferred embodiment of the chuck plate (which can be included in the inventive pitting apparatus) will be described with reference to FIGS. 15-18.

Figure 1:
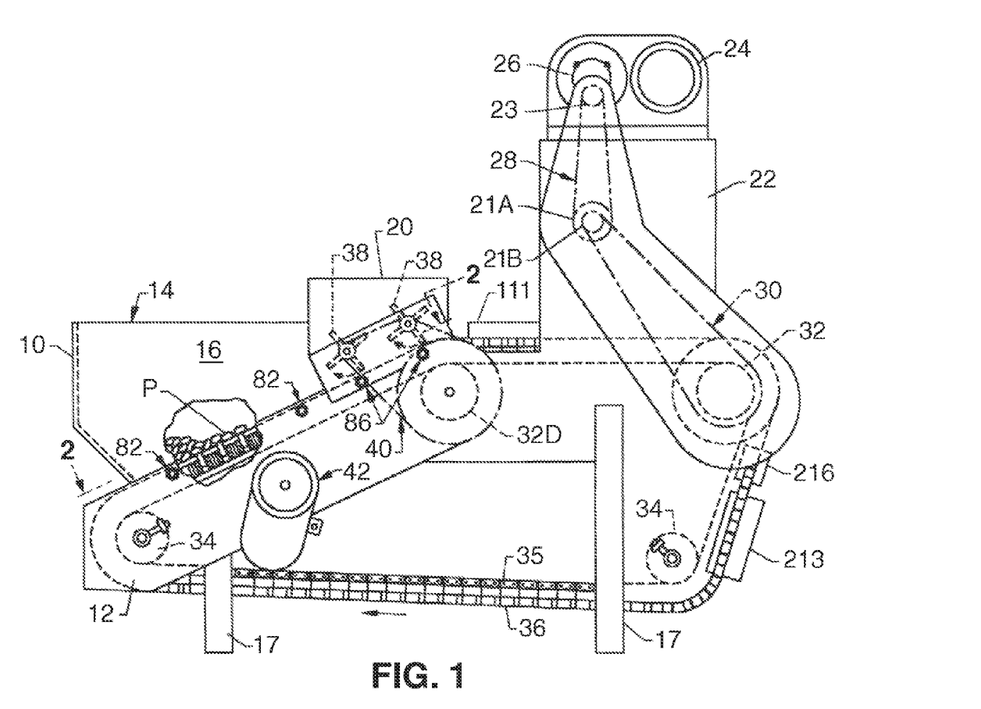
FIG. 1 is a side elevational view (partially cut away) of a prune pitting apparatus which includes either conventional top chuck plates 44, or chuck plates which embody the present invention (in place of conventional implementations of plates 44).

FIG. 1 is a simplified side elevational view (partially cut away) of a prune pitting apparatus of the general type described in above-cited U.S. Pat. Nos. 3,556,281 and 5,870, 949. The FIG. 1 apparatus is conventional in implementations in which its fruit holders include conventional top chuck plates 44. The FIG. 1 apparatus is an embodiment of the inventive pitting apparatus in each implementation thereof in which its fruit holders include chuck plates which embody the present invention (e.g., plates 144 of FIGS. 15-18) in place of conventional implementations of plates 44.

Figure 2:
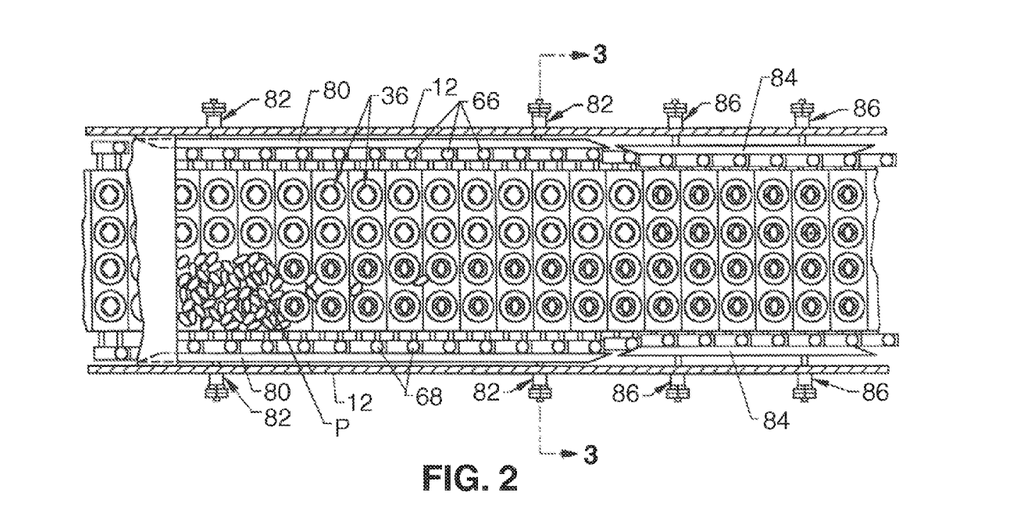
FIG. 2 is a cross-sectional view of a portion of the prune pitting apparatus of FIG. 1, taken along line 2-2 of FIG. 1.
Figure 4:
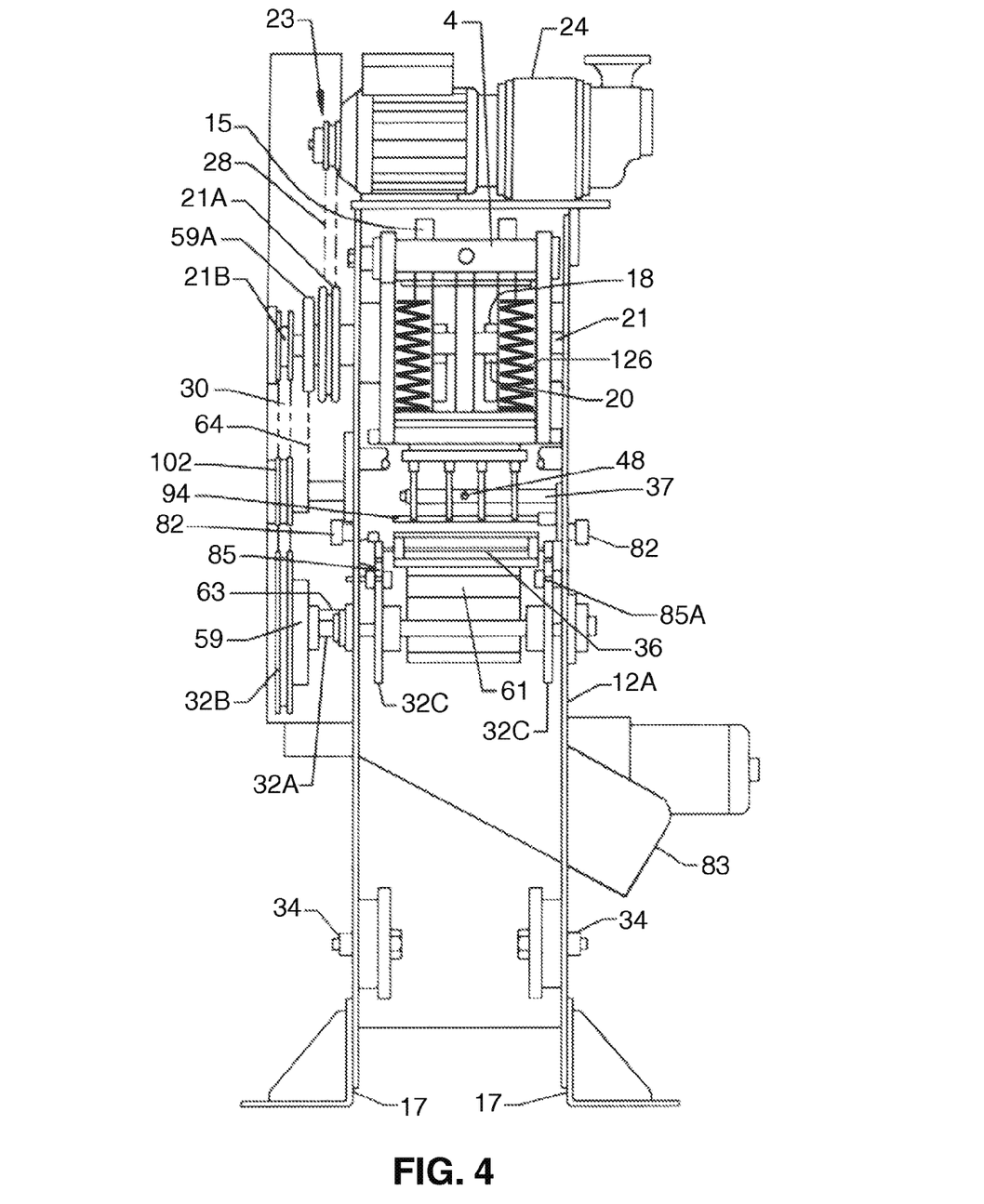
FIG. 4 is an end elevational view of a conventional pitting knife assembly of the type used in the FIG. 1 apparatus (with the pitting knives in a lowered position).

FIG. 2 is a cross-sectional view of the FIG. 1 apparatus taken along line 2-2 of FIG. 1. The apparatus of FIG. 1 includes a frame (with sideplates 12, legs 17, and pitting housing 22), pulley and sprocket assembly 32, sprocket assembly 32D, disks 34, and two conveyor chains 35 looped around sprocket assemblies 32 and 32D and disks 34. The drive mechanism comprises motor 24, speed reducer 26, pulley 23 (attached to a first shaft mounted for rotation relative to housing 22), pulleys 21A and 21B (attached to a second shaft mounted for rotation relative to housing 22), drive belt 28 looped around pulleys 23 and 21A, and drive belt 30 looped around pulley 21B and a pulley of assembly 32. In operation, motor 24 and speed reducer 26 cause pulley 23 to rotate clockwise (in FIG. 1), thus causing belt 28 to rotate both pulleys 21A and 21B clockwise and causing belt 30 to rotate assembly 32 clockwise. Rotating assembly 32 drives each of the conveyor chains 35 clockwise around a loop defined by sprocket assemblies 32 and 32D and disks 34. One of the chain loops is in the plane of FIG. 1; the other chain loop is in a plane parallel to the plane of FIG. 1. As shown in FIG. 4, pulley and sprocket assembly 32 includes pulley 32B and sprockets 32C, all connected to shaft 32A. As belt 30 rotates pulley 32B, pulley 32B in turn rotates shaft 32A and sprockets 32C together as a unit, thereby driving chains 35 (each chain 35 being looped around one of sprockets 32C).

Figure 3:
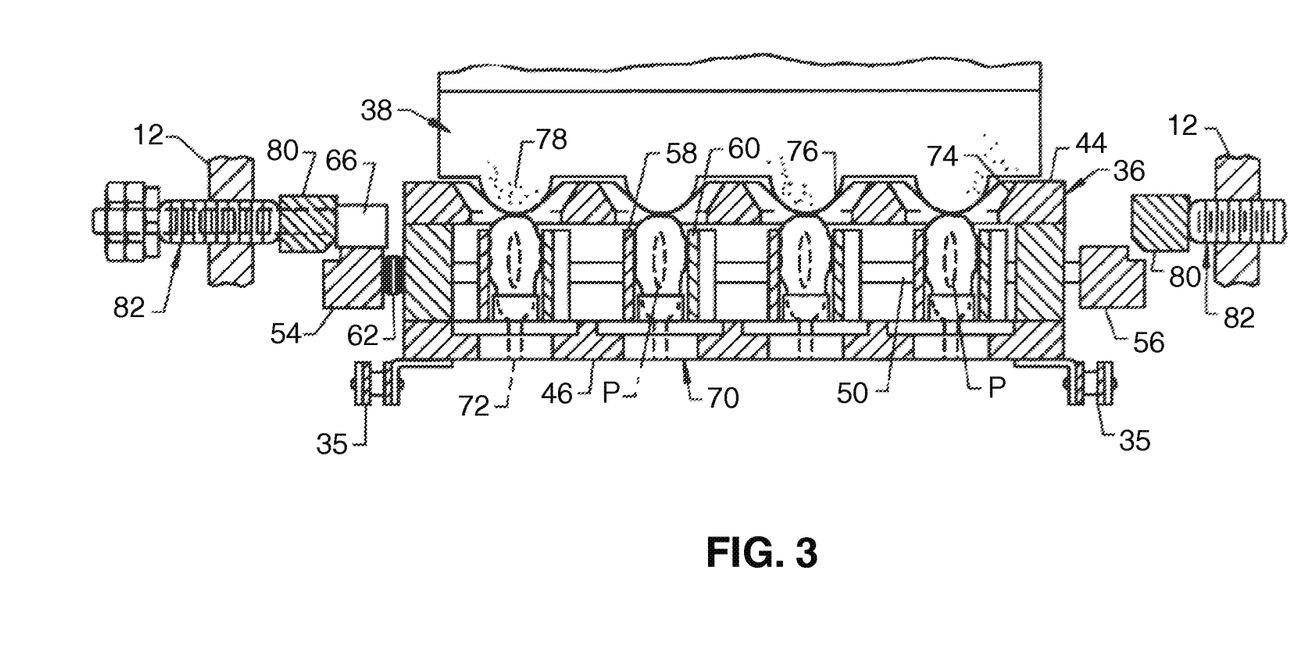
FIG. 3 is a cross-sectional view of the apparatus of FIG. 2 (with roller 68 omitted for clarity), taken along line 3-3 of FIG. 2, showing one of paddle wheels 38 sweeping across the pockets of one fruit holder 36.

As shown in FIGS. 2 and 3, fruit holders 36, connected between conveyor chains 35, are conveyed around the loop as chains 35 are driven. A roller carrier 54 is attached at one end of each holder 36, and a roller carrier 56 is attached at the holder's other end. A roller 66 is attached to each carrier 54, and a roller 68 is attached to each carrier 56. Each fruit holder includes four pocket members 58 and four pocket members 60, which define four adjustable pockets for holding the articles to be pitted. Variable-length rods 50 extend between carriers 54 and 56. Springs 62 between holder 36 and each of carriers 54 and 56 spring-load the rods into their maximum-length configuration (in which members 58 and 60 are oriented to hold the pockets in an open configuration). Members 58 and 60 are pivotably mounted to rods 50 so that when rods 50 are compressed by action of cams 84 (mounted along sideplates 12) on rollers 66 and 68, the members 58 and 60 pivot to close the pockets. When cams 80 allow springs 62 to move rods 50 to their elongated configuration, members 58 and 60 pivot in the opposite direction to open the pockets.

FIG. 3 is a cross-sectional view of the FIG. 2 apparatus (with roller 68 omitted for clarity) taken along line 3-3 of FIG. 2, showing one of paddle wheels 38 sweeping across the pockets of a fruit holder 36. As shown in FIGS. 2 and 3, cams 80 are separated by a relative large distance, so that the pockets defined by fruit holders 36 are open when holders 36 translate past cams 80. As shown in FIG. 2, cams 84 are separated by a smaller distance so that the pockets defined by holders 36 are closed when holders 36 translate past cams 84. A third pair of cams (cams 85 and 85A, shown in FIGS. 4 and 5) is also mounted to sideplates 12 of pitting housing 22 to perform pocket opening and closing functions (to be described below) within housing 22. A fourth pair of cams (cam bars 111, one of which is shown in FIG. 1) is also mounted to side plates 12 between paddle wheels 38 and pitting housing 22 to perform pocket opening and closing functions (to be described below). Cams 80 are mounted in positions in which they cause the pockets to open when holders 36 translate past hopper 14 (to allow the pockets to receive prunes or other articles). Cams 84 are mounted in positions in which they cause the pockets to close when holders 36 translate past paddle wheels 38. Cams 85 and 85A are mounted in positions to cause the pockets to close as holders 36 approach pitting knives within housing 22, and then to open briefly immediately after the pit removal operation (while the pitting knives remain engaged with the fruit in holders 36), and then to close again as holders 36 continue to move through housing 22 after the pit removal operation.

Typically, cams 80 are attached to the frame by adjustable mounts 82, cams 84 are attached to the frame by adjustable mounts 86, and cams 85 and 85A are attached to the frame by adjustable mounts 37 (shown in FIG. 4), so that the distance between cams 80, the distance between cams 84 and the distance between cams 85 and 85A can be adjusted.

Hopper 14 (having sideplates 16 and endwall 10) of FIG. 1 is positioned so that the prunes, dates, or similar soft fruit to be pitted (e.g., prunes P shown in FIGS. 1 and 2) drop onto holders 36 as the holders pass under hopper 14. In operation, prunes P (or other articles to be pitted) fall from hopper 14 onto cups 70 of holders 36, as the conveyor translates holders 36 past the hopper, so that a prune (or other article) is loaded into each of at least some of the pockets defined by the holders 36.

The FIG. 1 apparatus includes an excess fruit removal assembly mounted within hood 20 (which is supported above the upper end of hopper 14). The excess fruit removal assembly is configured to remove excess prunes (prunes not properly seated in pockets defined by a holder) from each holder while leaving one prune seated in each pocket of each holder. The excess fruit removal assembly is typically implemented as a set of paddle wheels 38, each of the paddle wheel being configured to sweep across the cups of each holder.

After the conveyor translates holders 36 past hopper 14, the conveyor translates the holders (with fruit articles loaded into each of at least some of the pockets defined by the holders, and typically also excess fruit articles not properly seated in the pockets) past paddle wheels 38, and then through cam assembly 111.

Each holder 36 has a lower plate 46 in which a pitting cup 70 is mounted at the location of each pocket (holder 36 shown in FIG. 3 has four cups 70, one at the location of each pocket). Pitting cups 70 are sometimes referred to as pitting rubbers, since they are typically made of rubber. Each cup 70 has a pit ejection opening 72 extending through it. Each holder 36 also has an upper (top) chuck plate 44 with a funnel-shaped opening 74 at the location of each pocket (for guiding an article into the pocket so as to rest on cup 70 between members 58 and 60). As shown in FIG. 3, one of conveyor chains 35 is attached to one side of plate 46 of each holder 36, and the other of chains 35 is attached to the other side of such plate 46.

Paddle wheels 38 are rotatably mounted within hood 20, and are typically driven (by means not shown) to rotate sufficiently rapidly about their central axes (which are perpendicular to the plane of FIG. 1) so that the paddles of each wheel 38 sweep several times across each holder 36 as the holders 36 translate past the wheels 38. As indicated in FIG. 3, each time one of the paddles of wheel 38 sweeps across the pockets of a holder 36, protruding portions 78 of the paddle sweep through corresponding recesses 76 of the holder 36. Paddle wheels 38 are designed to sweep out of the pockets prunes (or other articles) that are not properly seated between a pair of pocket members 58 and 60. However, in some cases (especially with top chuck plate 44 of each holder 36 having conventional shape as shown in FIGS. 11-14), at least one prune (not properly seated between a pair of pocket members 58 and 60) can become lodged on the top chuck plate 44 of a holder 36, and can remain on the chuck plate 44 even after the holder has translated past paddle wheels 38.

For example, consider an implementation of top chuck plate 44 which has the conventional shape shown in FIGS. 11-14. This conventional implementation of plate 44 defines four circular openings 139 (each at the location of a pocket), and a funnel-shaped (sloping) surface 136 around each opening 139 for guiding an article of fruit through the opening into the pocket below (so that the fruit can fall onto cup 70 between members 58 and 60, when plate 44 is included in a holder 36 as shown in FIG. 3). Chuck plate 44 of FIGS. 11-14 has four openings 137 at its corners, through which bolts or screws can extend to fasten plate 44 to the remaining portion of holder 36. Chuck plate 44 of FIGS. 11-14 also has a pair of notches 138 adjacent to each surface 136 (each for receiving one of the paddles of wheel 38 as it sweeps over plate 44), and a large, non-sloping surface 135 between each two adjacent surfaces 136 and each two adjacent pairs of notches 138. The width, W, of the front edge of each non-sloping surface 135 (between the surface 135 and plate 44's front surface 133) is large relative to plate 44's overall width.

With top chuck plate 44 of each holder 36 having conventional shape as shown in FIGS. 11-14, a prune (not properly seated between a pair of pocket members 58 and 60) can become lodged on a surface 135 of a plate 44, or on an edge of the surface 135 (e.g., partially on the surface 135 and partially on an adjacent surface), and can remain on the chuck plate 44 even after the holder has translated past the paddle wheels 38. For example, due to the large width (W) of the front edge of each surface 135, a fruit may become lodged at this edge and can remain on plate 44 even after holder 36 has translated past paddle wheels 38. In this case, the action of paddle wheels 38 is ineffective to sweep the fruit through one of openings 139 into a pocket below said opening 139.

In accordance with the invention, an improved top chuck plate (e.g., plate 144 of FIGS. 15-18) is included on each holder 36 in place of a conventionally implemented top chuck plate (e.g., plate 44 of FIGS. 11-14). The improved chuck plate lacks large surfaces and edges on which excess fruit can become lodged, even after paddles of a paddle wheel have swept over the translating holder.

Top chuck plate 144 of FIGS. 15-18 is an embodiment of the inventive top chuck plate. Plate 144 has a top surface 140, a bottom surface 141, a front face 143, and a rear face 142, and defines four circular openings 149 which extend through plate 144 from top surface 140 to bottom surface 141. The top surface 140 has sloping surfaces 146 and 147 (portions of surface 140) around each opening 149 for guiding an article of fruit through the opening (so that the fruit can fall through the opening into a pocket defined by a fruit holder, e.g., onto a cup of the holder, when plate 144 is included as the top chuck plate of the holder). Sloping surfaces 146 and 147 around each opening 149 are shaped to guide an article of fruit through the opening into a pocket below it (so that the fruit can fall onto cup 70 between members 58 and 60, when plate 144 is included in a holder 36 in place of a conventional implementation of plate 44).

In chuck plate 144, one of the sloping surfaces 146 extends from front face 143 to each opening 149, another one of the sloping surfaces 146 extends from rear face 142 to the opening 149, and two of the sloping surfaces 147 extend between the front and rear surfaces 146 to the opening 149. Typically, plate 144 is made of hard, durable plastic.

Chuck plate 144 of FIGS. 15-18 has four openings 148 at its corners, through which bolts or screws can extend to fasten plate 144 to the remaining portion of holder 36. There is a curved top front edge 150 between one sloping surface 146 (at each opening 149) and front face 143 of plate 144, and a curved top rear edge 150 between the other sloping surface 146 (at the opening 149) and rear face 142 of the plate. The edges 150 of each pair of top front and top rear edges 150 are shaped to receive one of the paddles of wheel 38 as it sweeps over plate 144.

Figures 17, 18:
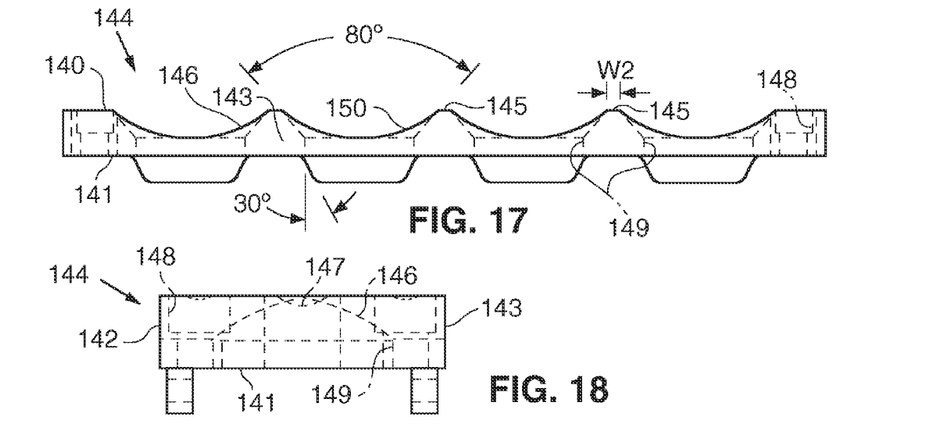
FIG. 17 is a side elevational view of chuck plate 144 of FIG. 15.
FIG. 18 is an end elevational view of chuck plate 144 of FIG. 15.

Top surface 140 of plate 144 has a small non-sloping surface 145 (oriented horizontally when the front and rear faces 142 and 143 are oriented vertically, as shown in FIGS. 17 and 18) of between each two adjacent pairs of surfaces 146 and each two adjacent pairs of edges 150. The width, W2, of the front edge of each non-sloping surface 145 (between the surface 145 and plate 144's front face 143) is small relative to plate 144's overall width.

With top chuck plate 144 of each holder 36 having shape as shown in FIGS. 15-18, it is very unlikely that a prune (not properly seated between a pair of pocket members 58 and 60) can become lodged on a surface 145 of a plate 144, or on an edge of the surface 145 (e.g., partially on the surface 145 and partially on an adjacent surface), and thus it is very unlikely that such an improperly seated prune can remain on the chuck plate 144 even after the holder has translated past the paddle wheels 38. For example, due to the small width (W2) of the front edge of each surface 145, it is very unlikely that a fruit may become lodged at this edge and can remain lodged on plate 144 even after holder 36 has translated past paddle wheels 38. Thus by using inventive plates 144 in place of conventional implementations of plates 44 (e.g., having the shape shown in FIGS. 11-14), the action of paddle wheels 38 is made much more effective either to sweep fruit through the chuck plate openings (149) into pockets below said openings 149, or to sweep excess fruit away from each of the plates 144.

Typically, each of chuck plate 144 (of FIGS. 15-18) and chuck plate 44 (of FIGS. 11-14) has an overall width of about 22 cm (from the left side to the right side of FIG. 12, 13, 16, or 17). Thus, the front face of each of chuck plates 44 and 144 typically has an overall width of about 22 cm. Also typically, the width, W, of the front edge of each non-sloping surface 135 of chuck plate 44 (of FIGS. 11-14) is greater than one tenth of the plate's overall width (e.g., W may be equal to 2.5 cm when the overall width is 22 cm). The width, W2, of each straight leading edge of the top surface of the inventive chuck plate (e.g., the width of each non-sloping surface 145 of chuck plate 144 of FIGS. 15-18) is preferably less than one twentieth (and preferably, less than one thirtieth) of the plate' overall width (e.g., W2 may be equal to 0.4 or 0.5 cm when the overall width is 22 cm).

With reference again to FIG. 1, assembly 111 comprises a pair of cam tracks, sometimes referred to as shaker bars. The shaker bars are cam tracks similar to above-described cam tracks 84, but each of the shaker bars has periodically varying width and thus defines a periodically varying cam surface, whereas each cam 84 has uniform width (away from its ends) and thus defines a straight cam surface. The shaker bars are mounted to sideplates 12 in positions in which they cause the pockets of each holder 36 to open and close rapidly and periodically as holders 36 translate past the shaker bars. This periodic opening and closing of the pockets causes the fruit in the pockets (the articles to be pitted) to settle completely into the pockets.

Still with reference to FIG. 1, after holders 36 (and the fruit carried in their pockets) have translated past shaker bars 111 and into housing 22, a reciprocating pitting knife assembly in housing 22 engages the translating fruit to push out the pit from within each fruit article.

The pits either fall directly into chute 83 (shown in FIG. 4), or they are brushed away from the holders by a rotating brush assembly (to be described with reference to FIG. 4) and then fall into chute 83. The rotating brush assembly comprises rotatably mounted pit brush 61 (having paddles tipped with rubber), brush drive sprockets 59 and 59A, brush drive shaft 63 (to which sprocket 59 is attached), and brush drive chain 64 looped around sprockets 59 and 59A. Sprocket 59A and above-described pulleys 21A and 21B are mounted to the same rotatable shaft. In response to rotation of sprocket 59A (with pulleys 21A and 21B) by motor 24, chain 64 rotates sprocket 59 and shaft 63, thereby actively rotating brush 61 relative to each of holders 36 translating away from the pitting knives so that the paddles of brush 61 sweep away any pits that may cling to the holders (so that the pits fall into pit chute 83).

Following pitting, the pockets defined by each holder are opened by cam assembly 216 (comprising a pair of pocket-opening cam tracks similar to above-described cam tracks 80) shown schematically in FIG. 1, and the pockets are then shaken by passing through shaker bar assembly 213 (comprising shaker bars similar to those described above) to cause the pitted fruit to fall out of the pockets.

The pitting knife assembly typically includes multiple rows of pitting knives (one row of knives for pitting fruit in each of two or more holders 36). Each row of pitting knives includes one knife for each pocket defined by one of the holders (e.g., one knife for each of the four pockets defined by holder 36). The pitting apparatus can have two rows of pitting knives, each row comprising four knives 102. The knives 102 in one row pit the prunes in one holder 36 while the knives in the other row simultaneously pits the prunes in another holder 36 (a total of eight prunes can simultaneously be pitted). One implementation of such a knife assembly will be described with reference to FIGS. 4-8.

Figure 5:
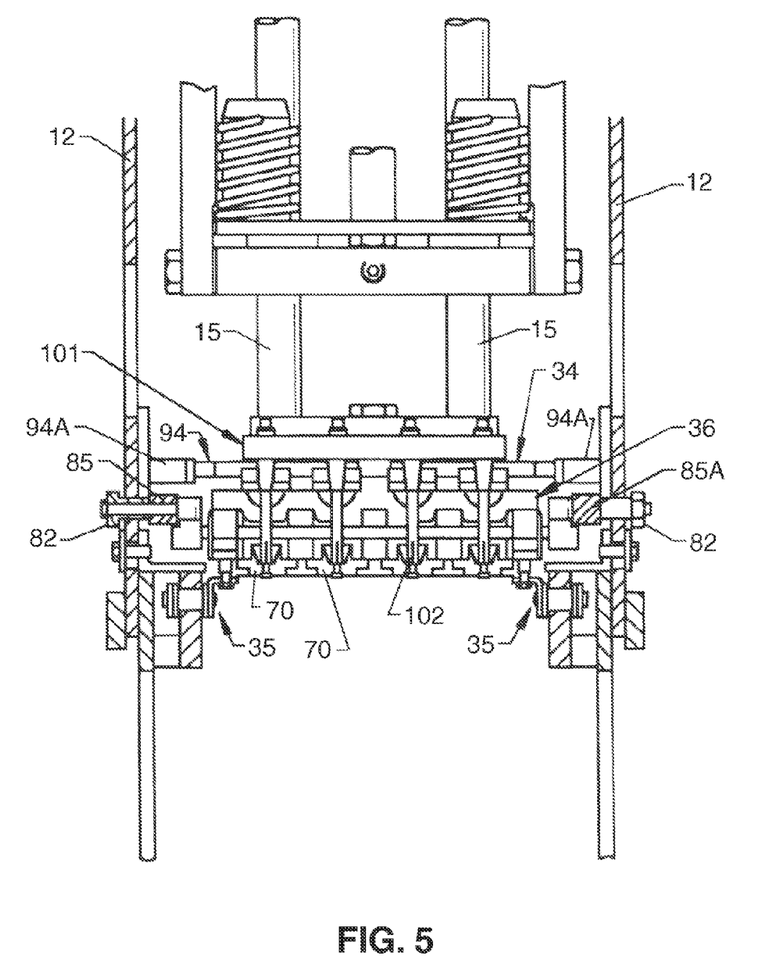
FIG. 5 is an enlarged view of a portion of the FIG. 4 assembly.
Figure 6:
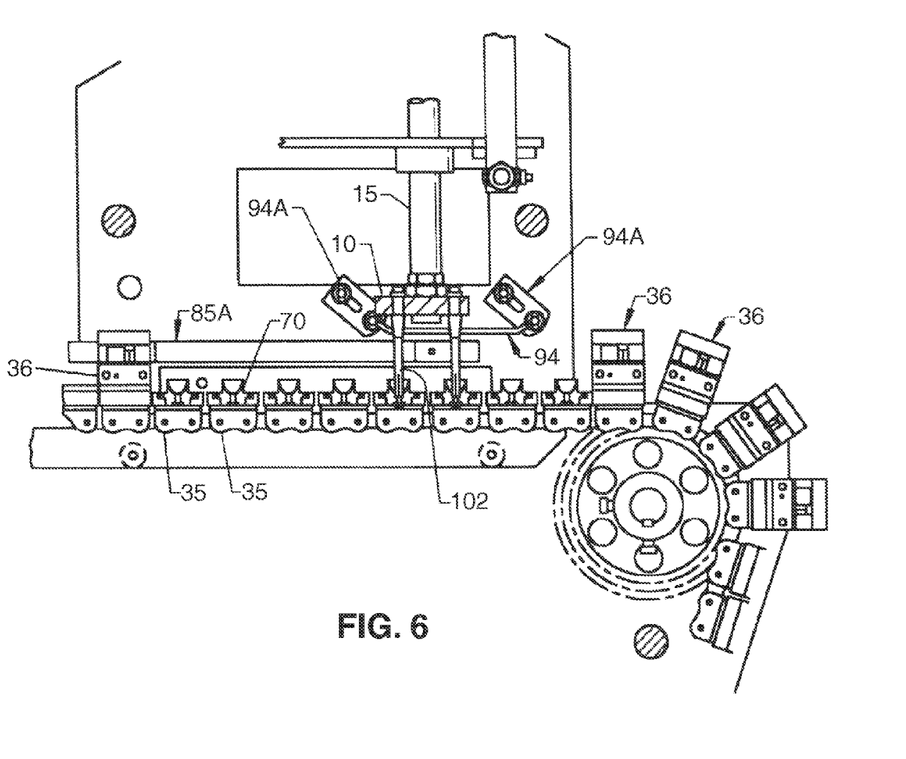
FIG. 6 is a cross-sectional view of a portion of the FIG. 4 assembly (in a vertical plane perpendicular to the plane of FIG. 4).
Figure 7:
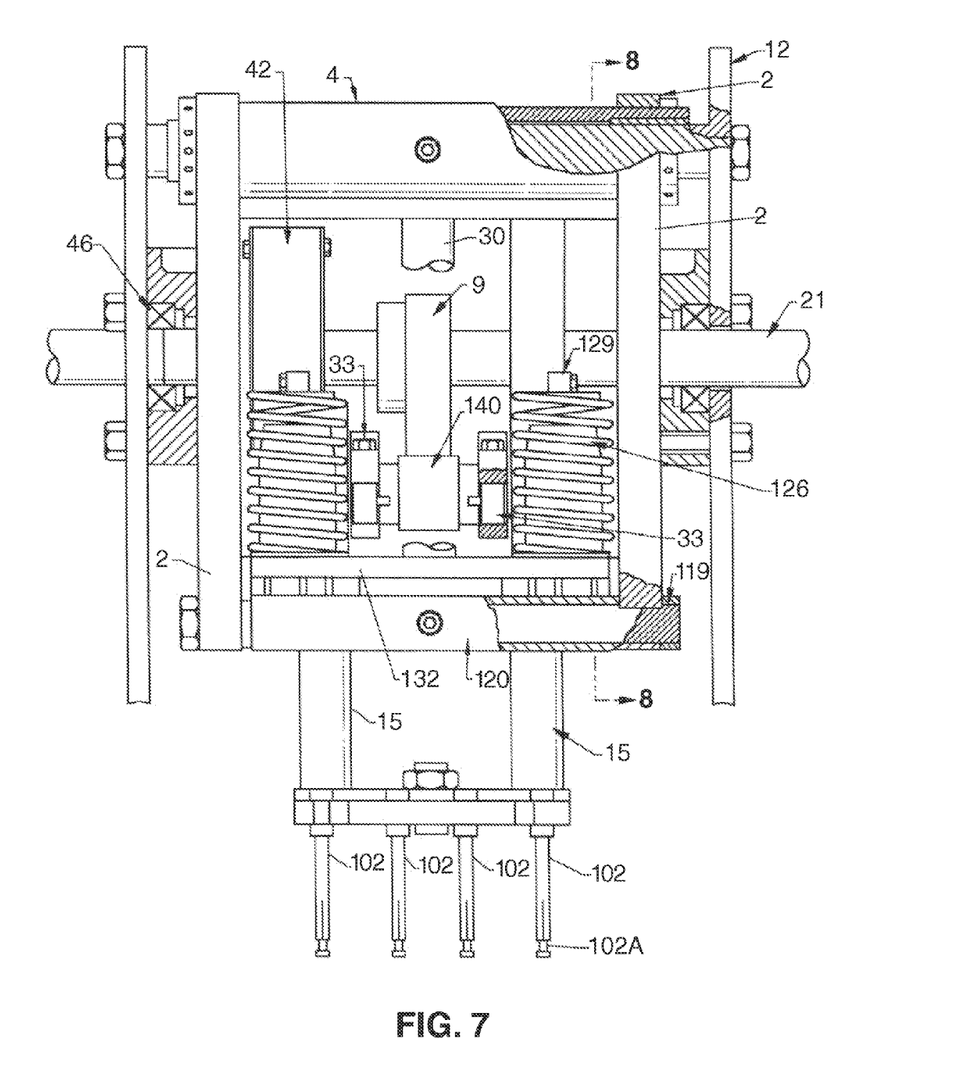
FIG. 7 is an enlarged elevational view of a portion of the conventional assembly of FIG. 4, with the pitting knife assembly in a raised position (in which springs 126 have relaxed back to their shortened, equilibrium position).
Figure 8:
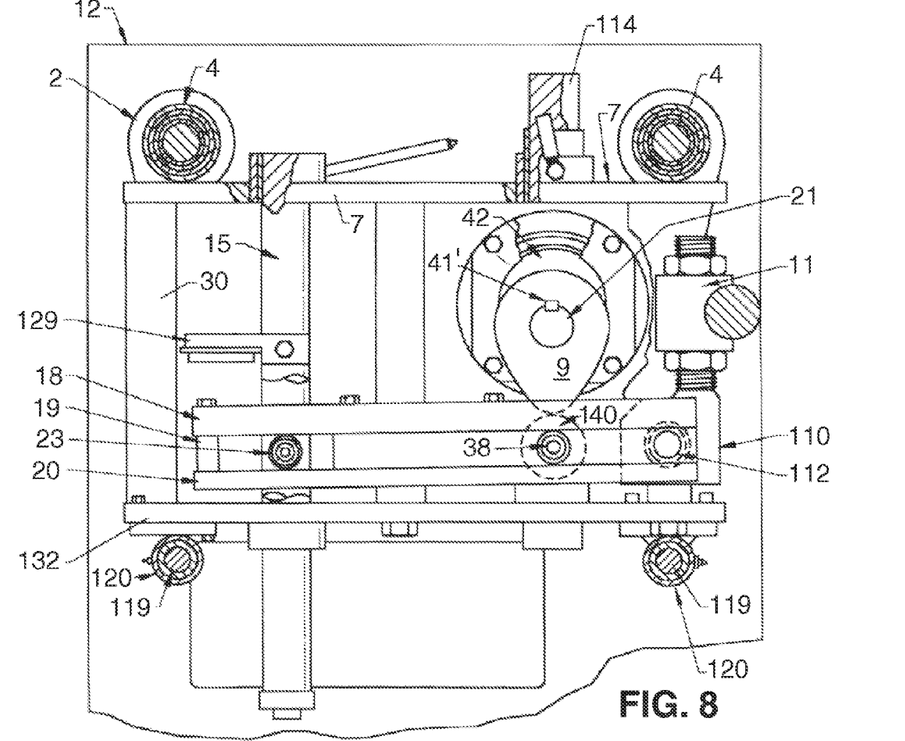
FIG. 8 is a cross-sectional view (along line 8-8 of FIG. 7) of the assembly of FIG. 7.

The pitting knife assembly of FIGS. 4-8 includes two shafts 4 which are fixedly mounted between vertically oriented plates 12 of housing 22 (as shown in FIGS. 7 and 8). A portion of the knife assembly of FIGS. 4-8 hangs from shafts 4 (in a manner to be explained below). The knife assembly also includes rotatably mounted drive shaft 21, which is rotated about its axis by belt 28, which is driven by motor 24. Cam 9 and eccentric 42 are fixedly mounted to shaft 21 (at different locations along the axis of shaft 21). To mount cam 9 to shaft 21, a channel (not shown) through cam 9 is aligned with an orifice (not shown) in shaft 21, and key 41' is inserted through the channel and tightened into the orifice.

Eccentric 42 is attached to shaft member 114, with freedom to rotate relative to member 114. As shaft 21 rotates about its longitudinal axis, eccentric 42 (which rotates as a unit with shaft 21) exerts force on member 114 which causes member 114 to undergo reciprocating motion as follows: the center of gravity of member 114 translates back and forth along an arc of a circle in the plane of FIG. 8, but member 114 does not rotate (about its center of gravity) in the plane of FIG. 8.

Member 114 is fixedly to a carriage comprising upper carriage plate 7, lower carriage plate 132, tie bar 30, and a pair of additional tie bars.

The carriage hangs from a pair of rotatably mounted swing arms 2. The upper end of each arm 2 is rotatably attached to one of parallel shafts 4. A pin 119 protrudes from the lower end of each arm 2 into a tube 120. Both tubes 120 are fixedly attached to lower carriage plate 132. Thus, as the carriage rocks back and forth (in response to rotation of eccentric 42), the carriage imparts this rocking motion to tubes 120 and pins 119, thus causing arms 2 to swing back and forth on fixed shafts 4. As the carriage rocks, pins 119 translate reciprocally as a unit with tubes 120. During the reciprocal translation of pins 119 together with tubes 120, each pin 119 rotates relative to the tube 120 which surrounds it (about the common axis of the pin and the surrounding tube).

Two parallel plunger shafts 15 extend through upper carriage plate 7 and lower carriage plate 132, each with freedom to translate in the direction of its longitudinal axis relative to the plates 7 and 132. A pitting knife assembly (including four rows of pitting knives 102) is fixedly attached to the lower ends of shafts 15. Thus (assuming that shafts 15 are held fixed relative to the carriage), as the carriage (including plates 7 and 132) rocks back and forth, shafts 15 translate reciprocally as follows: the center of gravity of each shaft 15 translates back and forth along an arc of a circle in the plane of FIG. 8, but neither shaft 15 rotates (about its center of gravity) in the plane of FIG. 8.

However, the actual motion of shafts 15 (and the knives 102 fixedly attached thereto) is more complicated, because a mechanism (including cam 9 and rocker arm unit 33) provided to reciprocate shafts longitudinally relative to the carriage as the carriage rocks back and forth. Unit 33 includes top rocker arms 18, rocker spacer 19, bottom rocker arms 20, and rocker arm body 38, to be described below). The longitudinal motion of shafts 15 is timed relative to the swinging motion thereof (by the orientation of cam 9 relative to that of eccentric 42), so that the knives 102 undergo the following motion: knives 102 move longitudinally downward (into engagement with the prunes to be pitted) while the carriage swings in the direction of motion of the prunes (which is toward the left in FIG. 8), knives 102 then move longitudinally upward (until they are out of engagement with the prunes) while the carriage continues to swing in the direction of motion of the prunes, knives 102 then continue to move longitudinally upward while the carriage begins to swing in opposite direction (toward the right in FIG. 8), and finally knives 102 begin to move longitudinally downward (toward a new set of prunes to be pitted) while the carriage starts to swing in the direction of motion of the prunes.

Each knife 102 can have a groove 102A (a small diameter portion) near its tip (as shown in FIG. 7).

Next, with reference to FIGS. 5 and 6, we describe the pitting operation in more detail (in an implementation in which motor 24 continuously translates holders 36 around the loop defined by sprocket assemblies 32 and 34). FIG. 5 shows a holder 36 and one row of four knives 102 in their lowest position (extending all the way through pitting rubbers 70 of the four pockets defined by the holder), in the position the knives would occupy immediately after pushing pits downward (through rubbers 70) from within four articles of fruit seated in the pockets. FIG. 6 shows one knife 102 of each of the two rows of knives 102, also in the lowest knife position. For clarity, portions of some of the holders 36 mounted on chains 35 are not shown in FIG. 6 (only the pitting rubbers 70 of the partially-shown holders 36 are visible in FIG. 6).

As shown in FIGS. 5 and 6, fruit stripping grill 94 is mounted (by brackets 94A) between plates 12. After the pitting operation, as knives 102 move upward and to the right (when viewed as in FIG. 6) relative to fixedly mounted grill 34, the grill strips the pitted fruit from the knives. The pitting knives 102 then move back to the left (when viewed as in FIG. 6) away from grill 94. The holders (with pitted fruit) then translate to cam assembly 216 (which opens the spring-biased pockets of each holder) and then to cam assembly 213 (which shakes the pitted fruit from the pockets) so that the pitted fruit fall from the holders into a product bin or conveyor (not shown). Optionally, water is sprayed on the pitted fruit and on grill 94 (e.g., from spray pipe 37 and spray nozzle 48 shown in FIG. 4).

In the plane of FIG. 5, cam tracks 85 and 85A (each mounted to one of plates 12 of housing 22 as shown in FIG. 5) are separated by a relative small distance, so that the pockets defined by holders 36 are closed to grip tightly the fruit being pitted. After the pitting step, each holder 36 of FIGS. 5 and 6 continues to translate (out of the plane of FIG. 5; toward the right in FIG. 6) until the holder (e.g., the holder 36 shown in FIG. 5) encounters notches in cam tracks 85 and 85A. An example of such a notch is notch 85B shown in cam track 85A of FIG. 13. While each holder 36 translates between these notches, the holder's springs (springs 62, described with reference to FIG. 3) briefly relax and are then re-compressed (thereby briefly opening the pockets). Knives 102 (which extend through the fruit in each pocket of the holder at the end of the pitting step) begin to translate upward while the pockets are briefly open. The brief opening of each pocket (in response to relaxation of the springs) releases pressure on the pitted fruit in each pocket, thereby allowing upward-translating knives 102 to strip the fruit from pitting rubbers 70 of the pockets before the pockets return to their closed configuration. This action improves the efficiency of separation of the pitted fruit from the holders (by assemblies 216 and 213) following pitting.

As noted, each of cam tracks 85 and 85A has a notch in its cam surface. The cam tracks are mounted so that each holder 36 translates between input ends of tracks 85 and 85A before the pitting step, and then translates between the notches after the pitting step. Since there are two rows of pitting knives 102 which simultaneously pit fruit in two holders 36, one holder of each such pair of holders translates between the notches immediately after the pitting step, and the second holder of each pair translates between the notches only after the first holder has done so.

As each pair of adjacent holders 36 translates along their looped path, the pockets of both holders are simultaneously closed (to perform the pitting operation), and then simultaneously opened (for a brief time while the knives begin to retract), and then simultaneously closed again (while the knives 102 continue to retract upward). Then, when the knives 102 have retracted sufficiently far upward so that their tips approach grill 94, the pockets open again so that grill 94 can strip from knives 102 any pitted fruit that clings to the knives. Of course, the pockets should be open during the stripping step, so as not to reduce the efficiency with which the retracting knives separate from the pitted fruit.

Next, with reference again to FIGS. 7 and 8, we describe the manner in which cam 9 and rocker arm unit 33 cause shafts 15 to execute longitudinally reciprocating motion, thereby cyclically raising and lowering the pitting knives 102 attached to the lower ends of shafts 15. As best shown in FIG. 8, top rocker arm 18 and bottom rocker arm 20 of unit 33 are attached to each other at one end of unit 33 by rocker spacer 19 and at the other end of unit 33 by rocker arm body 38. One end of body 38 of unit 33 (comprising pin 112 shown in FIG. 8) is pivotally attached to stroke adjustment bearing screw 110 and stroke adjustment support bar 11. Element 110 is adjustably attached to support bar 11, and bar 11 is fixedly attached to one of frame plates 12. With element 110 fastened in a selected position relative to bar 11, unit 33 is free to pivot reciprocally (both clockwise and counterclockwise in the plane of FIG. 8) about pin 112 in response to the forces alternately exerted thereon by rotating cam 9 and shafts 15 (which are spring-loaded as described below). Before operating the apparatus, element 110 can be repositioned relative to bar 11 in order to change the position of pin 112 and unit 33 (and thus shafts 15 engaged with unit 33) relative to the frame of the apparatus during operation.

A cam follower 140 is attached to unit 33 between the fixed end of unit 33 (the end attached to pin 112) and the free end of unit 33 (the left end in FIG. 8). A cam follower 23 protrudes from each of shafts 15 into engagement with unit 33 (near unit 33's free end), so that when unit 33 pivots clockwise in FIG. 8, unit 33 pulls cam followers 23 upward (and thus unit 33 pulls shafts 15 longitudinally upward). Shafts 15 are spring-loaded by compressing two identical springs 126 between carriage plate 132 and spring centering members 129 (one member 129 is fixedly attached to each of shafts 15). The lower end of each spring 126 is held in position by a centering plug portion of plate 132.

The outer surface (cam surface) of cam 9 engages cam follower 140. When the large radius portion of cam 9 (the portion of cam 9 having greatest radial thickness relative to the central longitudinal axis of shaft 21) rotates into engagement with cam follower 140, cam 9 pushes follower 140 down, thus pivoting the arm unit 33 counterclockwise about pin 112, which causes arm unit 33 to pull cam followers 23 downward, which in turn translates shafts 15 longitudinally downward relative to the carriage. As shafts 15 translate longitudinally downward relative to the carriage, spring centering members 129 move downward (with shafts 15) relative to the carriage, thereby compressing springs 126.

Then, when continuing rotation of shaft 21 rotates the small radius portion of cam 9 (the portion of cam 9 having less radial thickness than does the large radius portion) into engagement with cam follower 140, compressed springs 126 relax (their length increases), thus pushing members 129 upward and causing shafts 15 to translate longitudinally upward relative to the carriage. As shafts 15 translate longitudinally upward relative to the carriage, cam followers 23 pivot arm unit 33 clockwise about pin 112. This pivoting motion of arm unit 33 pushes cam follower 140 upward so that cam follower 140 remains in contact with cam 9.

Figure 9:
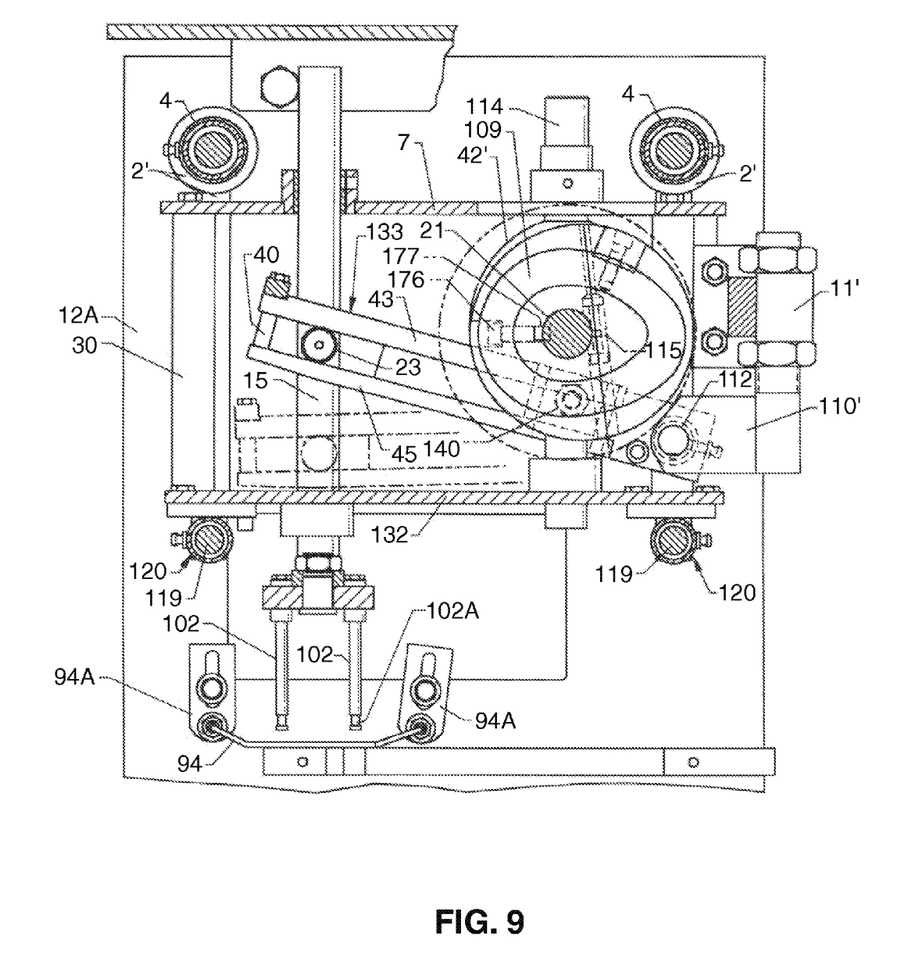
FIG. 9 is a cross-sectional view (in a vertical plane) of a portion of a pitting knife assembly including a box cam.
Figure 10:
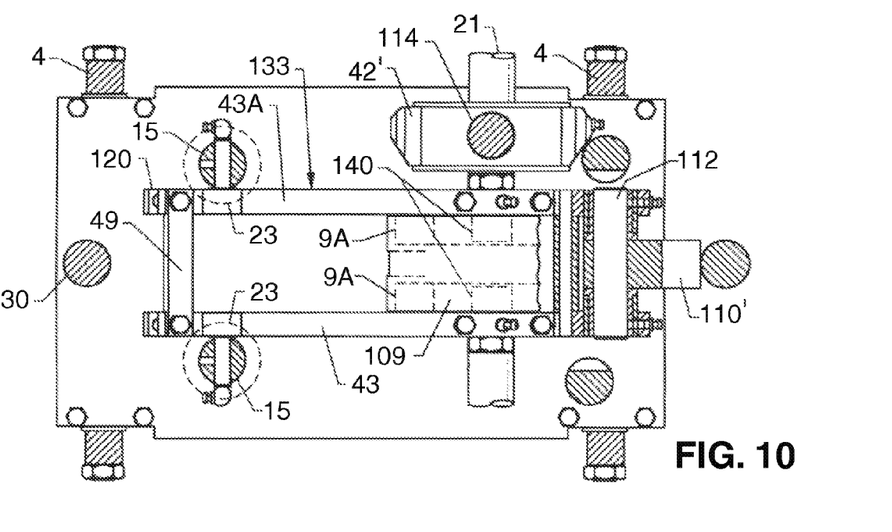
FIG. 10 is a cross-sectional view (along line 18-18 of FIG. 9) of the FIG. 9 assembly (with several elements omitted for clarity).
Figure 11:
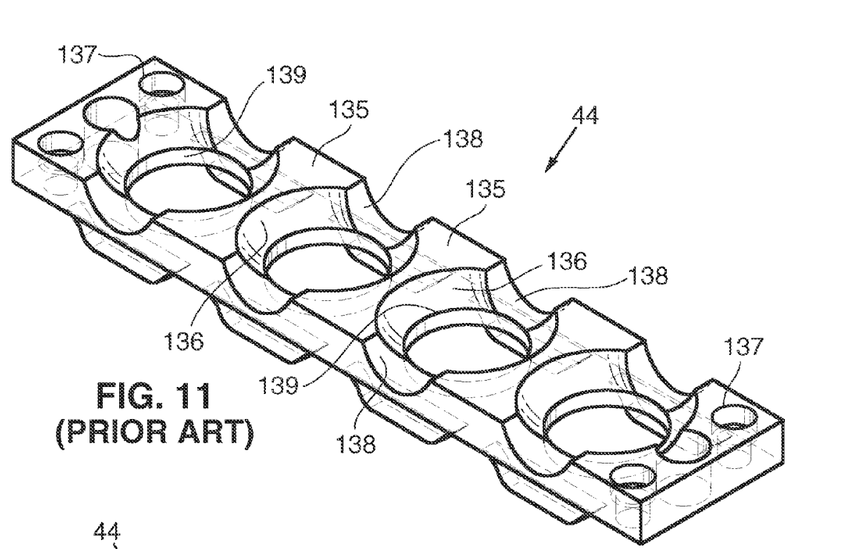
FIG. 11 is a perspective view of a conventional top chuck plate (which can be used to implement each of plates 44 of the FIG. 1 apparatus).
Figure 12:
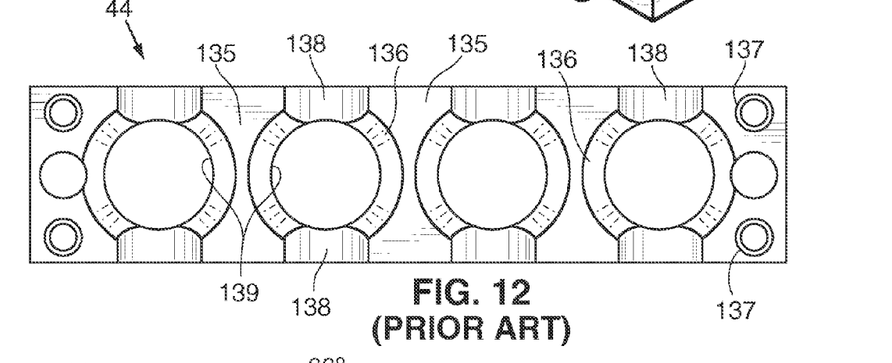
FIG. 12 is a top elevational view of the chuck plate of FIG. 11.
Figures 13, 14:
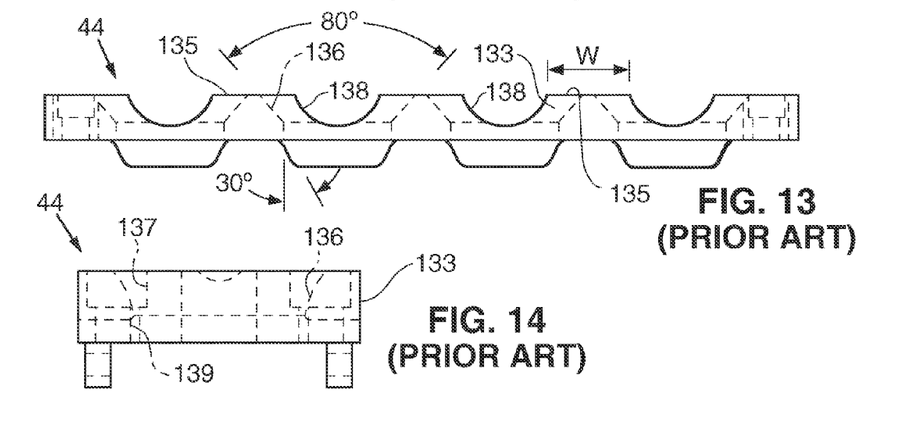
FIG. 13 is a side elevational view of the chuck plate of FIG. 11.
FIG. 14 is an end elevational view of the chuck plate of FIG. 11.
Figure 15:
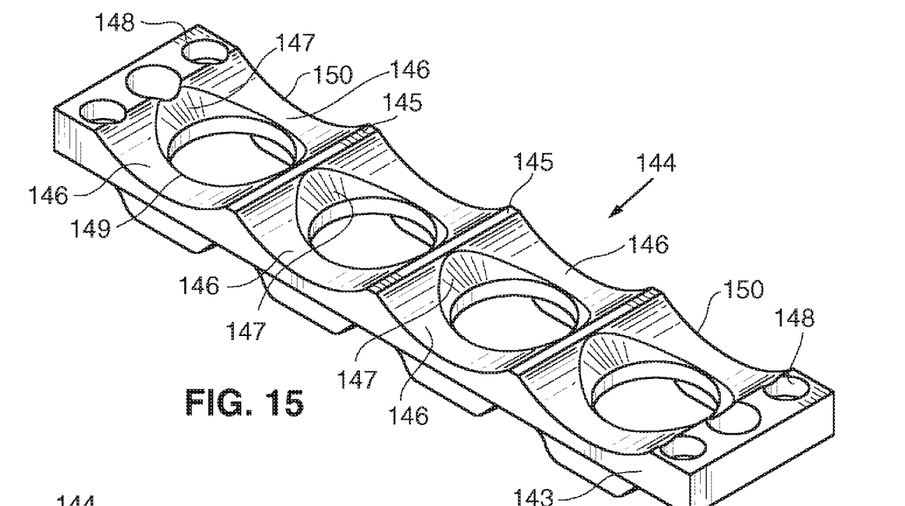
FIG. 15 is a perspective view of an embodiment of the inventive top chuck plate (which can be used to implement each of plates 44 of the FIG. 1 apparatus).
Figure 16:
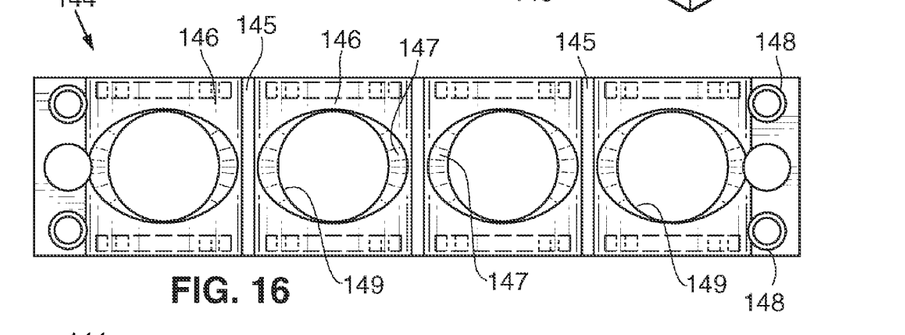
FIG. 16 is a top elevational view of chuck plate 144 of FIG. 15.

FIG. 9 is a cross-sectional view (in a vertical plane) of a portion of a pitting knife assembly which can replace the pitting knife assembly of FIGS. 7 and 8 in the apparatus of FIG. 1. FIG. 10 is a cross-sectional view (along line 18-18 of FIG. 9) of the FIG. 9 assembly (with several elements omitted for clarity). The main difference between the assembly of FIGS. 7 and 8 and the assembly of FIGS. 9 and 10 is that the latter assembly employs box cam 109 to move a rocker arm assembly reciprocally (both up and down), rather than both a conventional cam 9 (to move a rocker assembly down during part of its cycle) and springs 126 (to move the rocker assembly up during the remaining part of its cycle).

The FIG. 9/10 assembly includes several components which are identical to corresponding components in FIGS. 7 and 8, and which are identically numbered in FIGS. 7, 8, 9, and 10. These components have been described above, and their description will not be repeated below with reference to FIGS. 9 and 10.

The following components of the FIG. 9/10 assembly differ from similar components of the FIG. 7/8 assembly: rocker arm unit 133 of FIGS. 9 and 10 has slightly different shape than rocker arm unit 33 of FIGS. 7/8; swing arms 2' of FIG. 9 have slightly different shape than swing arms 2 of FIGS. 7 and 8 (arms 2' have the same function as arms 2); eccentric 42' of FIGS. 9 and 10 has slightly different shape than eccentric 42 of FIGS. 7 and 8 (eccentric 42' has the same function as eccentric 42, and eccentric 42' is attached to member 114, at a bearing portion of member 114, with freedom to rotate relative to member 114); lower carriage plate 132 of the carriage of FIGS. 9 and 10 does not have centering plug portions of the type described with reference to FIGS. 7 and 8 (since the FIG. 9/10 assembly lacks springs 126); and stroke adjustment bearing screw 110' and stroke adjusting support bar 11' of FIGS. 9/10 have slightly different shapes than stroke adjustment bearing screw 110 and support bar 11 of FIGS. 7/8 (members 110' and 11' have the same function as members 110 and 11). Bar 11' is fixedly attached to frame plate 12. Before operating the apparatus, screw 110' can be repositioned relative to bar 11' in order to change the position of pin 112 and unit 133 (and thus shafts 15 engaged with unit 133) relative to frame plate 12 (and the entire frame of the apparatus) during operation.

Additional details of typical implementations of box cam 109 and rocker arm unit 133 are described in referenced U.S. Pat. No. 5,870,949.

As best shown in FIG. 10, box cam 109 is fixedly mounted to shaft 21 (at a different location along the axis of shaft 21 than the location at which eccentric 42' is fixedly mounted) using set screw 176, key 177, and optionally also split clamp 115 (clamp 115 has two portions which can be tightened together) shown in FIG. 9. To mount cam 109 to shaft 21, key 177 is inserted in shaft 21. Then set screw 176 is inserted through a channel in cam 109 into a tapped hole in cam 109, and both the first and second portions of split clamp 115 are optionally inserted in a channel in cam 109. Cam 109 is then appropriately positioned with respect to shaft 21. Then, set screw 176 is advanced into engagement with key 177. To lock box cam 109 onto shaft 21, screw 176 is tightened against key 177 in shaft 21 and box cam 109, and the second portion of clamp 115 (if present) is tightened against shaft 21 and the first portion of clamp 115 (if present).

Box cam 109 has a groove (a recessed portion) in each of its side faces. Each groove defines an outer cam surface and an inner cam surface opposed to the outer cam surface. The cam surfaces of one side face of cam 109 define an oblong, closed first cam track. The cam surfaces of the other face of cam 109 define an oblong, closed second cam track which is a mirror image of the first cam track.

One cam follower 140 (shown in FIGS. 9 and 10) attached to upper arm 43 of rocker arm unit 133 between the fixed end of unit 133 (the end attached to pin 112) and the free end of unit 133 rides between the cam surfaces of the first cam track. Another cam follower 140 (shown in FIG. 10) attached to upper arm 43A of rocker arm unit 133 between the fixed end of unit 133 (the end attached to pin 112) and the free end of unit 133 (the left end in FIG. 9) rides between the cam surfaces of the second cam track. The first and second cam tracks are aligned, so that one cam follower 140 is always directly below (into the plane of FIG. 9) the other cam follower 140 when the knife assembly is viewed from the viewpoint of FIG. 9.

A cam follower 23 protrudes from each of shafts 15 into engagement with unit 133 (near unit 133's free end) as shown in FIGS. 9 and 10.

Since each cam follower 140 always rides between an upper and a lower cam surface of cam 109 (regardless of the rotational orientation of shaft 21 and cam 109), cam 109 exerts an upward force on cam followers 140 (and thus on unit 133) during some portions of the rotational cycle of cam 109 and cam 109 exerts a downward force on cam followers 140 (and thus on unit 133) during the other portions of cam 109's rotational cycle. In particular, when the large radius portion of the aligned cam tracks (the cam track portion along which the inner cam surfaces are radially farthest from the central longitudinal axis of shaft 21) engages cam followers 140, cam 109 pushes followers 140 down, thus pivoting arm unit 133 counterclockwise about pin 112 (in the plane of FIG. 9), which causes arm unit 133 to force cam followers 23 downward, which in turn translates shafts 15 longitudinally downward relative to the carriage. When shaft 21 continues to rotate, the small radius portion of the aligned cam tracks (the cam track portion along which the inner cam surfaces are radially nearest to the central longitudinal axis of shaft 21) engages cam followers 140, cam 109 pushes followers 140 up, thus pivoting arm unit 133 clockwise about pin 112 (in the plane of FIG. 9), which causes arm unit 133 to force cam followers 23 upward, which in turn translates shafts 15 longitudinally upward relative to the carriage.

Cam follower 140 rotatably attached to each of arms 43 and 43A can include a roller (for engaging cam tracks of box cam 109) rotatably mounted to a threaded shaft. To mount the cam follower to arm 43 or 43A, the shaft is inserted through a hole in the arm and a nut is threaded onto the shaft to retain the cam follower in place.

In operation of the knife assembly of FIGS. 9-10, cam followers 140 ride in the cam tracks of box cam 109, thus forcing unit 133 to pivot relative to fixed pin 112 and screw 110'. As unit 133 pivots (clockwise or counterclockwise with respect to the central axis of pin 112), unit 133 drives shafts 15 longitudinally up or down, as follows. A cam follower 23 protrudes from one shaft 15 into the space between arm 43 and arm 45 below arm 43, and another cam follower 23 protrudes from the other shaft 15 into the space between arm 43A and another arm 45 below arm 43A. Thus, cam followers 23 engage arms 43, 43A, and 45, and these arms force cam followers 23 up and down as they pivot with the rest of unit 133.

As unit 133 undergoes reciprocating pivoting motion in response to rotating box cam 109, the entire carriage assembly (including shafts 30, 15, and 114 and carriage plates 7 and 132) undergoes rocking motion in response to rotating eccentric 42'. More specifically, eccentric 42' is attached (at a bearing) to shaft member 114', with eccentric 42' having freedom to rotate relative to member 114'. As eccentric 42' rotates with shaft 21, eccentric 42' exerts force on member 114' which causes member 114' to undergo reciprocating motion as follows: the center of gravity of member 114' translates back and forth along an arc of a circle in the plane of FIG. 9, but member 114' does not rotate (about its center of gravity) in the plane of FIG. 9. This rocking motion of the carriage imparts a rocking component to the motion of shafts 15 (perpendicular to the longitudinal axes of shafts 15), which enables shafts 15 to translate knives 102 so as to follow translating specimens of fruit during periods when cam 109 is forcing shafts 15 (and thus knives 102) longitudinally downward into engagement with the fruit.

The pitting knife drive assembly of FIGS. 9-10 can be mounted in a fruit pitting apparatus (e.g., the pitting apparatus of FIG. 1 or the inventive pitting apparatus) to drive the pitting knives. The pitting knife assembly includes a box cam (e.g., box cam 109), means for rotating the box cam (e.g., drive shaft 21 and motor 24), a pivot unit which undergoes reciprocating pivoting motion in response to the rotating box cam (e.g., rocker arm unit 133), and a set of one or more shafts to which pitting knives can be mounted (e.g., shafts 15 to which knives 102 can be mounted) which reciprocate longitudinally in response to the reciprocating pivoting motion of the pivot unit. The pitting knife assembly preferably also includes a subassembly (e.g., shaft 114' and eccentric 42' and the carriage comprising arms 2', plates 7 and 132, and shaft 30 of FIGS. 9 and 10) for causing the shafts to undergo reciprocating motion in directions perpendicular to their longitudinal axes. The latter subassembly can include a carriage driven by a rotating eccentric (e.g., eccentric 42'), where the eccentric and the box cam are mounted along a common drive shaft, and the means for rotating the box cam include a motor for rotating the drive shaft (thereby rotating both the box cam and the eccentric).

Typical embodiments of the inventive pitting apparatus (e.g., typical implementations of the apparatus of FIGS. 1-8) have a continuous fruit holder conveyor drive mechanism to translate holders 36 continuously around the loop defined by chains 35 (even during pitting).

Alternative embodiments of the inventive pitting apparatus can be implemented with an intermittent fruit holder conveyor drive mechanism to accomplish pitting of prunes, dates, or similar soft fruit. Such embodiments of the invention can be implemented so that the fruit holder conveyor drive mechanism translates fruit holders (e.g., holders 36) into position for pitting, then keeps the holders stationary during pitting, and then translates the holders away from the pitting position (so that each holder undergoes intermittent motion). To improve the efficiency with which such embodiments separate the pitted fruit flesh and pits from the holders after pitting, the apparatus can include an actively (e.g., pneumatically, or by solenoid) driven actuator assembly that moves (at appropriate times during the pitting cycle) a pair of cam tracks to vary the force with which each fruit holder grips fruit during and after pitting. For example, an apparatus of this type can be an implementation of the apparatus of FIG. 1-8, with an intermittent fruit holder conveyor drive and with fixedly mounted notched cam tracks 85 and 85A replaced by non-notched cam tracks that are actively driven (moved relative to the frame of the apparatus) to vary the force with which each fruit holder grips fruit during and after pitting.

In some embodiments, the invention is an apparatus for pitting fruit (e.g., prunes) of any of the types described above, but with one or more of its conveyors implemented as elastomeric timing belts rather than as metal chains (such as chain 35 looped around sprockets 32 and 34). Use of such timing belts eliminates problems which can result due to chain stretch and eliminates the need to lubricate metal conveyor chains.

The foregoing is merely illustrative and explanatory of preferred embodiments. Various changes in the component sizes and shapes, and other details of the embodiments described herein may be within the scope of the appended claims.

What is claimed is:

1. A fruit pitting apparatus, including:
holders defining pockets for holding soft fruit, wherein each of the pockets is movable between an open configuration and a closed configuration;
an excess fruit removal assembly;
a pitting knife assembly; and
a holder drive assembly configured to translate the holders along a closed loop past the excess fruit removal assembly and the pitting knife assembly, wherein the holders include at least one holder including a top chuck plate mounted to a pocket subassembly, the pocket subassembly defines at least one pocket movable between an open configuration and a closed configuration, the top chuck plate has a top surface and an overall width, wherein the top chuck plate also has a bottom surface, a front face, and a rear face, said chuck plate defines a set of openings, each opening in the set extends through the chuck plate from the top surface to the bottom surface, the top surface has sloping surfaces around each said opening for guiding an article of fruit through the opening, the chuck plate has, for each said opening, a curved top front edge between the sloping surfaces around the opening and the front face, and a curved top rear edge between the sloping surfaces around the opening and the rear face, wherein the top surface has a non-sloping surface portion between the sloping surfaces of each two adjacent openings in the set, each two adjacent curved top front edges, and each two adjacent curved top rear edges, and wherein the top chuck plate is shaped to guide an article of fruit into each said pocket and so that each said non-sloping surface portion has a leading edge at the front face, and each said leading edge has a width which is sufficiently small, relative to the overall width, such that there is an acceptably low risk that an article of fruit will remain lodged on the top chuck plate after the holder has translated past the excess fruit removal assembly.

2. The apparatus of claim 1, wherein the excess fruit removal assembly includes at least one paddle wheel having paddles, and the curved top front edge and the curved top rear edge for each said opening are shaped to receive one of the paddles of the paddle wheel as said one of the paddles sweeps over the top chuck plate.

3. The apparatus of claim 1, wherein each of the holders defines four pockets, the excess fruit removal assembly includes at least one paddle wheel, each said paddle wheel has four paddles, and each said paddle wheel is configured and positioned such that in operation of the pitting apparatus, each of the paddles sweeps over one of the pockets of each holder of a sequence of the holders.

4. The apparatus of claim 1, wherein each said non-sloping surface portion has a width which is less than one twentieth of the overall width.

5. The apparatus of claim 4, wherein each said non-sloping surface portion has a width which is less than one thirtieth of the overall width.

6. A fruit holder for use in a fruit pitting apparatus including an excess fruit removal assembly, said fruit holder including:
a pocket subassembly which defines at least one pocket movable between an open configuration and a closed configuration; and
a top chuck plate mounted to the pocket subassembly, wherein the top chuck plate has a top surface and an overall width, wherein the top chuck plate also has a bottom surface, a front face, and a rear face, said chuck plate defines a set of openings, each opening in the set extends through the chuck plate from the top surface to the bottom surface, the top surface has sloping surfaces around each said opening for guiding an article of fruit through the opening, the chuck plate has, for each said opening, a curved top front edge between the sloping surfaces around the opening and the front face, and a curved top rear edge between the sloping surfaces around the opening and the rear face, wherein the top surface has a non-sloping surface portion between the sloping surfaces of each two adjacent openings in the set, each two adjacent curved top front edges, and each two adjacent curved top rear edges,
and wherein the top chuck plate is shaped to guide an article of fruit into each said pocket and so that each said non-sloping surface portion has a leading edge at the front face, and each said leading edge has a width which is sufficiently small, relative to the overall width, such that there is an acceptably low risk that an article of fruit will remain lodged on the top chuck plate after the holder has translated past the excess fruit removal assembly.

7. The fruit holder of claim 6, wherein each said non-sloping surface portion has a width which is less than one twentieth of the overall width.

8. The fruit holder of claim 6, wherein each said non-sloping surface portion has a width which is less than one thirtieth of the overall width.

* * * * *